No. 830,225.  PATENTED SEPT. 4, 1906.
F. HABER.
TESTING GASEOUS MIXTURES.
APPLICATION FILED JULY 15, 1905.
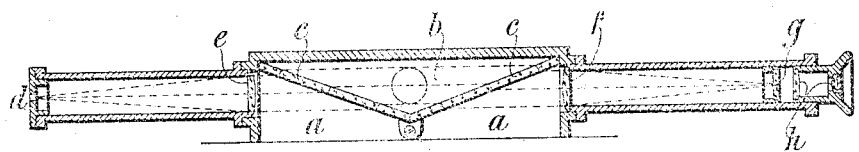
Witnesses
Paul Krüger
Fritz Sander
Inventor
Fritz Haber

UNITED STATES PATENT OFFICE.

FRITZ HABER, OF KARLSRUHE, BADEN, GERMANY, ASSIGNOR TO THE FIRM OF CARL ZEISS, OF JENA, GERMANY.

TESTING GASEOUS MIXTURES.

No. 830,225.      Specification of Letters Patent.      Patented Sept. 4, 1906.

Application filed July 15, 1905. Serial No. 277,105.

*To all whom it may concern:*

Be it known that I, FRITZ HABER, a citizen of the German Empire, residing at Karlsruhe, Baden, Germany, have invented a new and useful Improvement in Testing Gaseous Mixtures, of which the following is a specification.

The invention consists in a new method of testing gas—i. e., of determining by physical means the quantitative composition of a mixture of gas containing two components, each of which may consist of a single element or comprise several elements in an invariable proportion. The new method is based on that property of mixtures containing gases of unequal refractive power which consists in refracting the rays of light in a degree varying according to the ratio of composition. For producing refraction a second optical medium (a comparative medium) is required, and the light must be so conducted as to meet in a non-normal direction the surface where this medium and the gas mixture come in contact. If care be taken that the qualitatively equal mixtures, the quantitative composition of which requires testing, possess equal temperature and equal pressure and that the condition or state of the comparative medium is the same in each test, the degree of deflection suffered by the light under the actual refraction depends only upon the quantitative ratio between the two components of the mixture. In as far as the condition of the comparative medium may be supposed to be determined by its temperature this condition will be fairly maintained by keeping the mixture approximately at an equal temperature, because the mixture is confined in or passed through a metal chamber and the walls of the latter will readily enough nullify any noticeable difference of temperature between the mixture and the comparative medium. Hence with the above supposition as to the condition of the comparative medium in order to be able to make always a reliable estimate of the quantitative composition of the mixture from the degree of deflection it is sufficient that both the temperature and the pressure of the mixture keep approximately a certain fixed standard.

The contact-surface between the mixture and the comparative medium may be plane or curved, cylindrical or spherical, for instance. Strictly speaking, a second comparative medium always comes into operation. Even if the first passage of the light, which causes refraction, is provided for in the direction from the mixture to the comparative medium in contact with it, the exit from the comparative medium, although the exit-surface be plane, can only take place normally under one ratio of composition. Thus, generally, by reason of the non-normal passage into a new medium a second refraction must take place. If then the first medium is a plano-parallel plate and the second is gaseous, the latter represents the actual comparative medium, because the total deflection is the same as if the comparative gas and the mixture came into immediate contact in a plane parallel to the plate.

The chromatic dispersion accompanying refraction presents an obstacle to the convenient determination of the deflection. This is removed by using monochromatic light or by reducing the deflection, and thereby the dispersion. In using a gaseous comparative medium the deflection is always slight by reason of the difference between the refractive indices of gases being always very small, frequently so slight as to be only determinable with a sufficient accuracy by multiplying it. For this purpose the light may be conducted alternately from the mixture to the comparative gas, and vice versa, in such a way that the deflections are added one to the other.

The comparative gas may be simple or also compound, but in the latter case having a constant ratio of composition. In many cases it will be feasible to use air as comparative gas; frequently, also, one of the components of the mixture isolated by the absorption of the other component.

In cases where remarkable variations of pressure occur in the mixture correction of the ratio of composition as determined by the primary method is to be obtained by taking into account the pressure as observed or recorded. When using a gaseous comparative medium, this inconvenience may be avoided by maintaining this comparative gas and the mixture at an equal pressure throughout all variations of this pressure. Then in accordance with a known physical proposition the two relative refractive indices of the mixture and of the comparative gas—hence also the corresponding degrees of deflection—will be independent of the height of the pressure. The method thus modified will at the same time dispense with the requirement as to constancy of temperature, since according to another physical proposition the relative refractive indices of two gases which have an equal temperature and the pressures of which are kept in an invariable proportion are independent of the height of the temperature. This improved method therefore commends itself also in cases where the mixture is not subject to considerable variations of pressure, but where the maintenance of a fixed temperature would cause inconvenience. It may be added that the particular feature of the present method—that the accuracy of the immediate results is not affected by variations of temperature and pressure—has not been anticipated by any known method of testing gaseous mixtures.

Approximate equality of the temperature of the mixture and the comparative gas is, as already explained, always produced spontaneously. For the production and maintenance of an identical pressure in the mixture and the comparative gas various means may be employed, according to circumstances. It will be understood that in general the mixture to be tested is passing continuously through its chamber. If it emerge quickly by a wide channel from the chamber into the open, it is, while in the chamber, also approximately under atmospheric pressure and subject to barometrical variations, and if, moreover, in this case the free atmospheric air serves as comparative gas, the conditions of pressure are equal for both the mixture and the comparative gas. In cases where the pressure in the chamber of the mixture highly exceeds the atmospheric one or falls short of it, the comparative gas may also be forced or drawn through its chamber by the same means which act upon the mixture, and by means of throttle-valves it will be easy to equalize the pressure and its variations in both gases. This procedure of causing both the mixture and the comparative gas to flow each through its chamber and of securing identity of pressure in both chambers becomes particularly simple when one of the components of the mixture is used as comparative gas. In this case the mixture is either passed successively through the mixture-chamber, an absorption-chamber, and the comparative-gas chamber, or it is divided at once, one branch passing through the mixture-chamber, the other first through the absorption-chamber and then through the comparative-gas chamber. A still gas excluded from atmospheric air may, however, be used for comparison instead of a flowing gas. Identity of pressure in both chambers would in that case be effected by means of an impermeable flexible membrane or the like placed in the wall between the chambers.

As in the older methods of testing gaseous mixtures, the result can be made accessible to observation and measurement only or it can be registered. The latter will be done by the convenient photographical method. The new process also resembles the older ones in that the observation and measurement or the record can refer to the fundamental physical magnitude, (here the refractive index or the deflection of the light,) from which the ratio of composition is found by the aid of a table or immediately to this ratio of composition. Again, as in the older processes, the table or the scale supplying ready data may be gained empirically—for instance, by the composition of a series of mixtures to serve as a gage—so that it is not necessary here to show how its values are derived by calculation, (but which offers no difficulties to the physicist.)

The means available for carrying out the new method resemble in part those used for the experimental determination of the refractive index of a gaseous medium. An illuminating apparatus supplies the light the deflection of which is to be investigated suitably to the purpose in the form of a pencil of parallel rays or of a combination of such pencils. If refraction takes place in the non-normal passage through a plane contact-surface between the mixture and the comparative medium, the refracted pencil (or combination of pencils) may be received by a collective lens which concentrates the light to a point (or a combination of such points) in its principal focal plane. Under certain circumstances the collective lens may also be part of the illuminating apparatus, in accordance with the well-known system of autocollimation, when the refracted light must be reflected by a mirror for repeated refraction, with the result of a redoubled deflection. These means are made complete by an eyepiece the front focal plane of which coincides with the back focal plane of the collective lens, so that this lens becomes the objective of an astronomical telescope and also by a measuring appliance or by such an attachment that the collective lens becomes the objective of a registering-camera.

The measuring appliance connected with the observing eyepiece may consist of a scale situated in the focus of the eyepiece (in the image plane of the telescope) and which admits of the immediate reading of the displacement of the point of light (or combination of such points) produced by the deflection of the pencil, (or combination of pencils.) There may, however, be merely a mark within the image plane with which the point of light is to be brought to coincidence. The reading in that case is taken from the micrometer appliance, which may act upon a prism compensator for the purpose of nullifying the deflection or upon a mechanism for rotating the telescope by the angle of deflection or upon the mark itself, so as to displace it until it covers the point of light.

In the annexed drawing a simple device for carrying out the new process is illustrated by a vertical section.

The figure shows an arrangement where air under atmospheric pressure serves as the comparative gas and is contained in the lower chamber $a$, to which it has access by means of the open floor.

The mixture to be tested, whose refractive power for all proportions of mixture occurring in practice is supposed to be greater than that of air, flows through the upper chamber $b$, triangular in section, under atmospheric pressure. The partition separating the two chambers $a$ and $b$ is composed of two plano-parallel glass plates $c$ $c$. The illuminating device consists of a horizontal slit $d$, close behind which is placed any optional source of light, and also a collective lens $e$, which makes the rays of each pencil proceeding from the slit $d$ parallel. The pencils then pass from the left part of the air-chamber $a$ through the left glass plate $c$ into the mixture-chamber $b$ with a slightly-upward deflection. The passage of the pencils through the right glass plate is accompanied by another deflection in like direction and equal to the former in degree. The pencils pass through the collective lens $f$ and are thereby united as points in its focal plane, forming as a whole a horizontal image of the illuminated slit $d$. In this focal plane is placed a glass scale $g$, the divisions of which also lie horizontally. For accurate reading of the position of the image of the slit upon the scale the ocular $h$ is provided.

What I claim as my invention, and desire to secure by Letters Patent, is—

1. Process of determining the proportion of two components forming a gaseous mixture, consisting in measuring the refractive power of the mixture to be tested and introducing the value as measured into the relation between the refractive power and the quantitative composition of gaseous mixtures having the qualitative composition of the mixture to be tested.

2. Process of determining the proportion of two components forming a gaseous mixture, consisting in bringing the mixture to be tested in contact with a non-gaseous transparent medium, causing light to pass non-normally through the surface of contact, measuring its deflection and introducing the value as measured into the relation between the refractive power and the quantitative composition of gaseous mixtures having the qualitative composition of the mixture to be tested.

3. Process of determining the proportion of two components forming a gaseous mixture, consisting in bringing the mixture to be tested in contact with a transparant plate, at the other side of which a comparative gas is located, causing light to pass non-normally through the plate, measuring its deflection and introducing the value as measured into the relation between the refractive power and the quantitative composition of gaseous mixtures having the qualitative composition of the mixture to be tested.

4. Process of determining the proportion of two components forming a gaseous mixture, consisting in bringing the mixture to be tested in contact with a transparent plate, at the other side of which a comparative gas is located, causing luminous rays produced by a sharply-defined source of light to pass non-normally through the plate, uniting them in a focal image, measuring the position of this image and introducing the value as measured into the relation between the refractive power and the quantitative composition of gaseous mixtures having the qualitative composition of the mixture to be tested.

5. Process of determining the proportion of two components forming a gaseous mixture, consisting in bringing the mixture to be tested in contact with a transparent plate, at the other side of which a comparative gas is located, parallelizing the rays of the pencils issuing from a linear source of light, causing them to pass non-normally through the plate, uniting them in a linear focal image, measuring the position of this image and introducing the value as measured into the relation between the refractive power and the quantitative composition of gaseous mixtures having the qualitative composition of the mixture to be tested.

In testimony whereof I have signed my name to this specification in the presence of two subscribing witnesses.

FRITZ HABER.

Witnesses:
 PAUL KRÜGER,
 FRITZ SANDER.